US010136123B2

(12) United States Patent
Reichow et al.

(10) Patent No.: US 10,136,123 B2
(45) Date of Patent: Nov. 20, 2018

(54) DISPLAY SYSTEM WITH NORMALIZED SHOW LIGHTING FOR WAVELENGTH MULTIPLEX VISUALIZATION (WMV) ENVIRONMENT

(71) Applicant: DISNEY ENTERPRISES, INC., Burbank, CA (US)

(72) Inventors: Mark A. Reichow, Valencia, CA (US); Steven T. Kosakura, Tustin, CA (US); Thomas Tracey Tait, Santa Clarita, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 273 days.

(21) Appl. No.: 14/927,601

(22) Filed: Oct. 30, 2015

(65) Prior Publication Data

US 2017/0127052 A1    May 4, 2017

(51) Int. Cl.
*H04N 7/18* (2006.01)
*H04N 13/334* (2018.01)
*H04N 9/31* (2006.01)
*H04N 13/363* (2018.01)

(52) U.S. Cl.
CPC ......... *H04N 13/334* (2018.05); *H04N 9/3158* (2013.01); *H04N 9/3161* (2013.01); *H04N 9/3164* (2013.01); *H04N 9/3182* (2013.01); *H04N 13/363* (2018.05)

(58) Field of Classification Search
CPC .................................................. H04N 13/0431
USPC .......................................................... 348/53
See application file for complete search history.

(56) References Cited

U.S. PATENT DOCUMENTS

| 4,218,688 | A | * | 8/1980 | Monari | ................... | G03G 19/00 |
| | | | | | | 346/74.2 |
| 5,465,175 | A | * | 11/1995 | Woodgate | .......... | G02B 27/2214 |
| | | | | | | 348/E13.029 |
| 5,497,207 | A | * | 3/1996 | Kim | ..................... | G03B 21/132 |
| | | | | | | 353/65 |
| 6,166,496 | A | | 12/2000 | Lys et al. | | |

(Continued)

OTHER PUBLICATIONS

Berman, Arthur, "Basics of Stereoscopic Displays," Dec. 2, 2008; SID; Retrieved from URL:http://www.sid.org/Portals/sid/Files/pdf/BASID/Art%20Berman%20-%20SID%20Presentation%2012-02-08.pdf.

(Continued)

*Primary Examiner* — Leron Beck
(74) *Attorney, Agent, or Firm* — Marsh Fischmann & Breyfogle LLP; Kent A. Lembke

(57) ABSTRACT

A display system for illuminating surfaces of objects in a ride or show set for viewing by a viewer in a viewing space wearing three-dimensional (3D) glasses or headgear. The 3D glasses or headgear is adapted to pass or transmit light associated with a first set of three wavelengths to a left eye and to pass or transmit light with a second set of three wavelengths differing from the first set of three wavelengths. Each of these wavelengths may be associated with a primary color wavelength for providing left and right eye content to a viewer. The system, therefore, may include a wavelength multiplex visualization (WMV) projection system projecting light having the first and second sets of three wavelengths to provide the viewer stereo content via the 3D glasses or headgear.

20 Claims, 7 Drawing Sheets

(56) References Cited

U.S. PATENT DOCUMENTS

| | | | |
|---|---|---|---|
| 6,283,597 B1* | 9/2001 | Jorke | G02B 27/2207 |
| | | | 348/766 |
| 6,346,986 B1* | 2/2002 | Nguyen | G01B 11/0616 |
| | | | 250/205 |
| 7,402,831 B2 | 7/2008 | Miller et al. | |
| 7,832,869 B2 | 11/2010 | Maximus et al. | |
| 8,188,878 B2 | 5/2012 | Pederson et al. | |
| 8,220,931 B2 | 7/2012 | Silverstein et al. | |
| 8,220,938 B2 | 7/2012 | Silverstein et al. | |
| 8,237,777 B2 | 8/2012 | Silverstein et al. | |
| 8,476,844 B2 | 7/2013 | Hancock et al. | |
| 8,567,954 B2 | 10/2013 | Koehler et al. | |
| 8,870,381 B2 | 10/2014 | Freeman et al. | |
| 8,928,745 B2 | 1/2015 | Savvateev et al. | |
| 9,613,300 B2* | 4/2017 | Tin | G06K 9/6277 |
| 9,696,472 B2* | 7/2017 | Kurtz | G02B 5/223 |
| 9,696,558 B2* | 7/2017 | Richards | H04N 13/0422 |
| 9,786,253 B2* | 10/2017 | Raymond | G09G 5/14 |
| 2006/0072076 A1* | 4/2006 | Smoot | G03B 15/10 |
| | | | 353/34 |
| 2007/0146880 A1* | 6/2007 | Bleha | G02B 27/102 |
| | | | 359/468 |
| 2010/0215251 A1* | 8/2010 | Klein Gunnewiek | |
| | | | H04N 13/0022 |
| | | | 382/154 |
| 2011/0205251 A1* | 8/2011 | Auld | H04N 13/0422 |
| | | | 345/690 |
| 2013/0063816 A1* | 3/2013 | Mathiassen | G02B 27/2207 |
| | | | 359/464 |

OTHER PUBLICATIONS

"Million Color LED lightbulb," Jun. 17, 2015; Retrieved from URL:http://www.oznium.com/million-color-led-lightbulb.

* cited by examiner

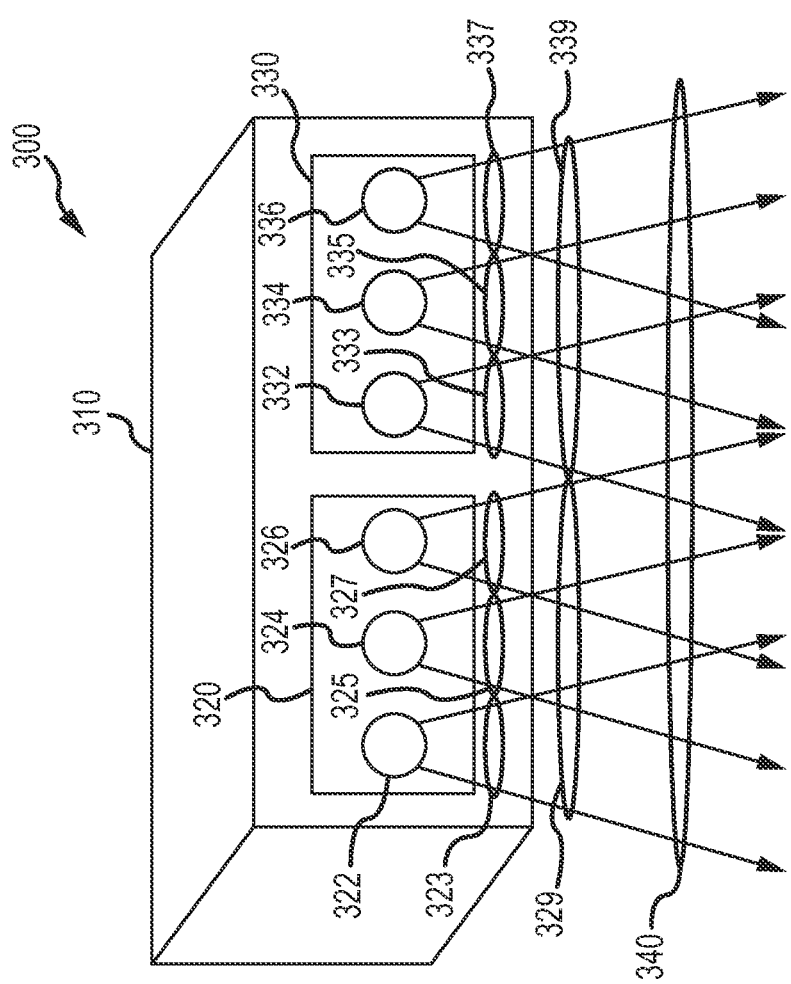

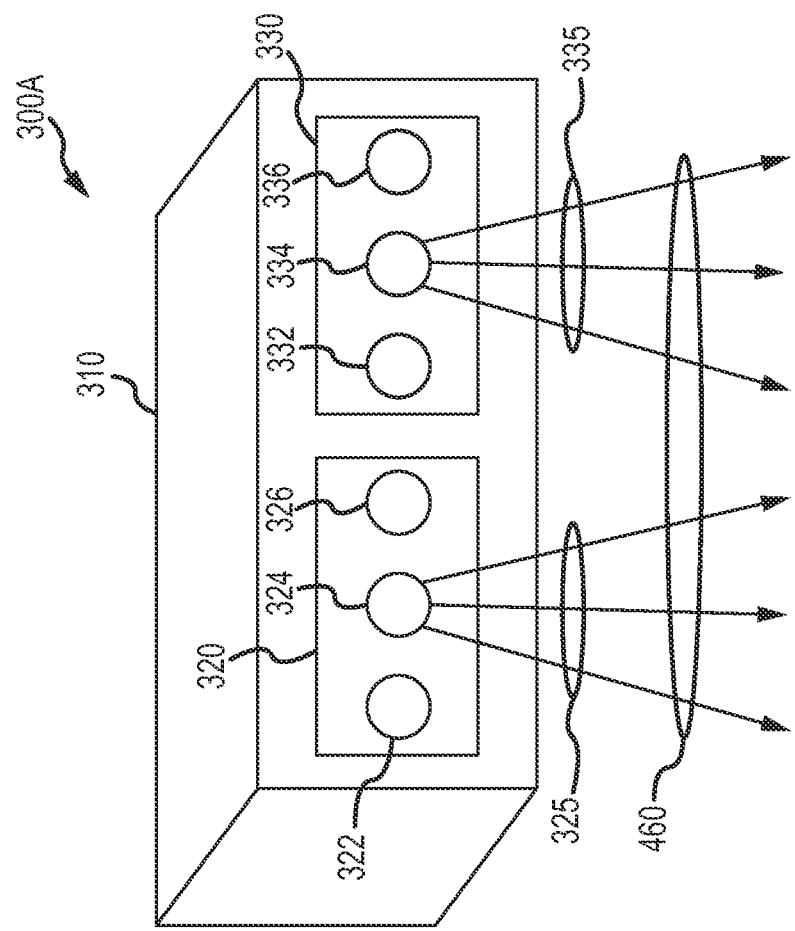

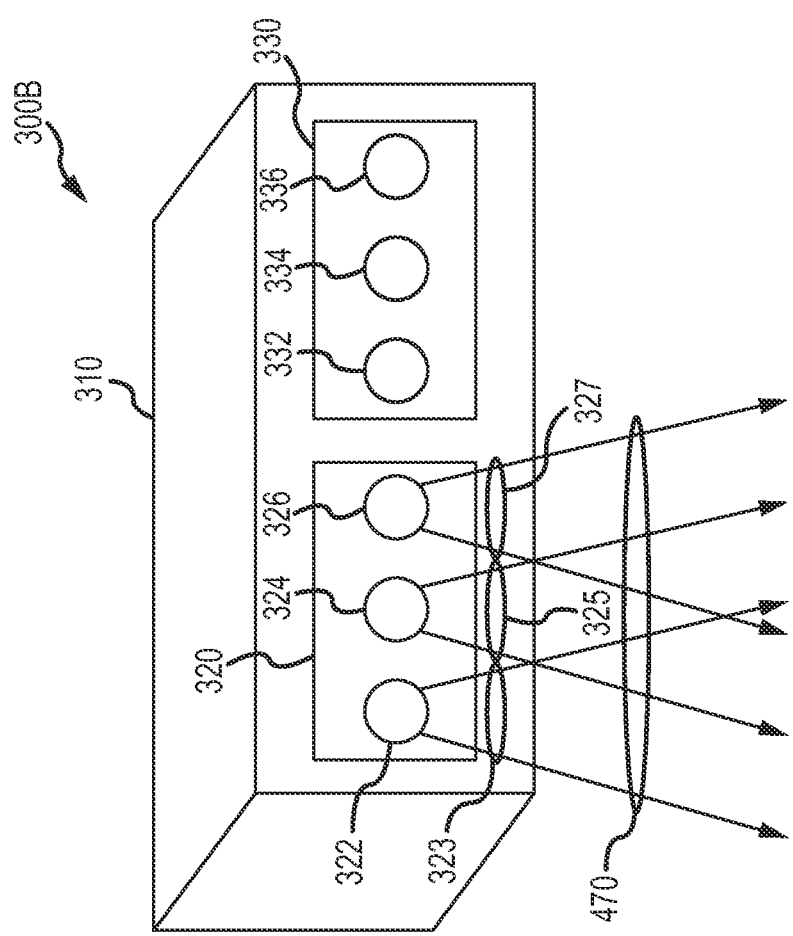

DISPLAY SYSTEM WITH NORMALIZED SHOW LIGHTING FOR WAVELENGTH MULTIPLEX VISUALIZATION (WMV) ENVIRONMENT

BACKGROUND

1. Field of the Description

The present description relates, in general, to three dimensional (3D) projection and display technology including 3D glasses or stereo glasses worn by viewers to perceive 3D imagery, and, more particularly, to 3D stereo display systems that are adapted for creating 3D effects or imagery with 3D content or media but without the need for conventional 3D projectors.

2. Relevant Background

Recently, there has been an increased interest in providing movies and other image-based content to viewers in 3D form, and there has been significant research in the past on technologies to produce 3D imagery. Most 3D technologies require the viewers to wear 3D glasses (or other headgear or other filters, which will be labeled "3D glasses" herein) such that left eye images are received by their left eye and right eye images are received by their right eyes. The combination of these right and left eye images are perceived by the viewers as 3D images or imagery (or stereo images), and 3D projection and display technology is used to create a stereo media environment for viewers including people in a passenger vehicle on an amusement park ride (e.g., a dark ride experience or the like).

Polarization and wavelength multiplex visualization ("WMV") are two main types of 3D technologies that are in widespread use in cinema applications and in other entertainment venues including amusement or theme parks (e.g., in 3D rides, 3D displays, and other park attractions). In each of these 3D technologies or systems, the displays or projection systems have relied upon or targeted raster-based displays such as video projection, film, displays, and the like.

With polarized technology, the viewer wears low-cost eyeglasses that contain a pair of different polarizing filters. Each of the viewer's eyes sees a different image (e.g., a right eye image and a left eye image that were provided by two cameras spaced apart the intraocular distance) because the filters pass only light having a particular polarization (i.e., matching the eyeglass filter) and block the light polarized differently (e.g., in the other polarization direction). Polarized technologies (linear and/or circular) are used to produce a 3D effect by projecting or displaying the same scene for viewing by both eyes, with the scene being depicted from slightly different offsets to create the necessary parallax to provide a 3D image. Use of this technology has the advantages of low cost glasses but is inefficient with light causing loss of brightness and requires a silvered screen to maintain polarization.

Due to these and other disadvantages with such 3D technologies, there has been increased interest in the use of wavelength multiplex visualization (also known as interference filters or comb filters and generally labeled "WMV" or "WMV technology" herein). WMV technology is based on a system of color. The specific color frequencies (e.g., left-eye RGB frequencies and right-eye RGB frequencies) utilized in each technology (or by each company's WMV products) are typically based on the specific delivery system and other parameters and company-specific goals.

Presently, there are several types of WMV technology used to provide 3D displays. In the first exemplary type of WMV technology-based 3D systems, a single projector is used that can project both left and right eye images using an alternate color wheel placed in the projector. The color wheel contains one more set of red, green, and blue filters in addition to the red, green, and blue filters found on a typical color wheel. The additional sets of three filters are able to produce the same color gamut as the original three filters but transmit light at different wavelengths. 3D glasses with complimentary dichroic filters in the lenses are worn by a viewer that filter out either one or the other set of the three light wavelengths. In this way one projector can display the left and right stereoscopic images simultaneously, e.g., by a stereoscopic projection process that is labeled herein as a first type of wavelength multiplex visualization or WMV (or is categorized as one form of wavelength multiplex visualization that may also be considered a narrowband-based WMV or a WMV implementing one or more narrowband source of illuminating light paired with 3D stereo glasses worn by a viewer to properly filter light from these sources).

A second exemplary type of WMV-based 3D system is built on a fiber-coupled, 6-primary projection system architecture rather than filtered or polarized broad-spectrum white light. In some systems using this second type of WMV, 6-Primary ("6P") laser projectors employ sets of red, green, and blue (RGB) laser lights, e.g., with one set being for the left eye and one, with slightly different wavelengths, for the right eye, which is why this second type of WMV-based 3D system is considered to employ or provide wavelength multiplex visualization. The "recipe" of wavelengths used may vary to achieve this second type of WMV-based 3D projection and for use in 3D glasses, with one exemplary system using a first or left laser projector providing light (red, green, and blue) at wavelengths of 465 nanometers (nm), 547 nm, and 657 nm and a second or right laser projector at 445 nm, 525 nm, and 637 nm. The viewer wears 3D glasses in these systems that filter out the different wavelengths and direct the colored light at the recipe-defined wavelengths to the intended eye. This second type of WMV may be thought of as primary or colored laser projector-based WMV.

There are a number of advantages associated with these systems including: effectiveness with light as almost 90 percent of the light from the projector makes it to the viewer's eye; no requirement for a silvered screen and can be both rear and front projected on nearly any surface; viewable from multiple points of view with no hot spot and with uniform brightness without regard to a viewer's point of view; useful in applications where a viewer may tilt or move their head; and a broad color gamut. As with the first type of WMV system, the stereo glasses for this second type of WMV system are expensive, and the light module and other projection components are also relatively expensive.

An ongoing challenge for many applications is how to integrate 3D projection or display systems in larger facilities rather than in the more contained theater setting. For example, many amusement parks include 3D theaters with long queues and 3D ride systems that now utilize wavelength multiplex visualization ("WMV") technology such that visitors (or "viewers") are now wearing stereo glasses adapted for use with such technologies rather than polarized glasses. These projection systems work through the realization that all humans see all colors using only the three color sensors in the eye for red, green, and blue. All other colors are synthesized by humans from mixtures of these three fundamental colors. As discussed above, for example, the first type of WMV system functions by splitting the red, green, and blue images to be displayed/projected into two narrow wavelength bands, e.g., Red1, Green1, and Blue1 (or RGB1) and Red2, Green2, and Blue2 (or RGB2). Then, for a left stereo image, the projector (or projectors if two are used) may project light with the wavelength bands for RGB1 and, for a right stereo image, the projector may project light with the wavelength bands for RGB2. The color separation is done with very narrowband color filters or lenses provided in the stereo glasses (e.g., with three filters overlaid for each of the viewer's eyes) such that the lens over the left eye only passes the RGB1 light or images while the lens over the right eye only passes the RGB2 light or images.

Projectors for systems employing wavelength multiplex visualization, which in combination may be considered conventional WMV projectors (or simply WMV projectors), narrowband multiplexing projectors, and the like, are expensive such that their use is generally limited to large-scale theatrical experiences. However, in amusement park rides and some theater settings, the viewers may be offered and be wearing the 3D stereo glasses designed for these systems outside of the theater or projection space. For example, a 3D-based ride may include one or more theater-type portions where a WMV projector(s) is used to project 3D images viewable by the ride participants. However, the ride participants will be wearing the 3D stereo glasses in other portions of the ride, which may be 50 to 90 percent of the length of the ride, where there is no 3D imagery being projected. One solution would be to provide the WMV projectors along the entire length of the ride, but this solution is typically discarded as being prohibitively expensive.

Hence, there remains a need for display systems and methods for providing 3D imagery to viewers such as in locations or spaces inside, nearby, and even outside of a conventional 3D theater setting (e.g., in the queue to or from the theater) and inside or even outside of portions of a ride configured for 3D projection (e.g., a dark ride using 3D projection along one or more portions of the ride path).

SUMMARY

The inventors recognized that presently there are many situations where participants in 3D entertainment activities, such as a 3D theater, a 3D-based dark ride, and the like, are wearing 3D stereo glasses while they are in spaces where no 3D imagery is being projected. Further, the inventors recognized there are a number of types of wavelength multiplex visualization (WMV) technologies provided by companies that produce projection systems for distribution and/or license the technology to others for implementations. These companies and/or their licensees differentiate their products from other WMV products by varying the individual wavelengths for the RGB bandwidths (e.g., providing differing types of WMV technologies). The wavelength "prescriptions" may also vary based on the type of light source used in the system, e.g., use of a mercury lamp, a xenon lamp, or a laser-based delivery system may all drive how the prescription or formula of left and right-eye wavelengths is designed or generated even though each generally can be said to use WMV technology. The inventors also understood that extinction can occur with the use of WMV technologies where wavelengths for the right eye (or left eye) are completely extinct in the left eye (or right eye), and this issue can be addressed to improve quality of a displayed 3D image.

In a particularly relevant example, a 3D ride may utilize a type of wavelength multiplex visualization (WMV) technology (e.g., Dolby 3D, Christie 6P, or other wavelength multiplex visualization technologies presently utilized or yet to be developed), and the riders wear their 3D stereo glasses or 3D glasses for WMV systems (suited for the particular technology and its wavelengths) throughout the ride even though WMV-based 3D projectors are only provided in one to several locations along the ride (e.g., for 10 percent or less of the ride length). It was understood that it would be useful to provide display systems in spaces where viewers are wearing wavelength multiplex visualization glasses (e.g., WMV-based glasses and all such glasses referred to herein as "3D stereo glasses" or "3D glasses" or "WMV glasses"), and these display systems should be configured to provide 3D imagery without the need for an expensive 3D projector or conventional WMV projector.

More particularly, a display system is provided for illuminating surfaces of objects for viewing by a viewer in a viewing space wearing 3D glasses or headgear, which is adapted to pass or transmit light associated with a first set of three wavelengths to a left eye and to pass or transmit light with a second set of three wavelengths differing from the first set of three wavelengths. Each of these wavelengths may be associated with a primary color wavelength for providing left and right eye content to a viewer. The system, therefore, may include a wavelength multiplex visualization (WMV) projection system projecting light having the first and second sets of three wavelengths to provide the viewer stereo content via the 3D glasses or headgear.

Further, though, the display system includes a WMV light source providing colored light for illuminating the surfaces of the objects for the viewer to observe through the 3D glasses or headgear. The output colored light typically will be light at a wavelength matching one or more wavelength in the first and second sets of three wavelengths (e.g., to provide red, green, and/or blue light to one or both of the viewer's eyes through their 3D glasses or headgear). In some implementations, the WMV light source or fixture includes six light emitting diode (LED) emitters each operable to provide light at a differing one of the first and second sets of three wavelengths (e.g., a red LED emitter, a green LED emitter, and a blue LED emitter in each set). The WMV light source may further include a controller providing control signals to independently operate each of the LED emitters. In such cases, the controller can operate the WMV light source to selectively operate the LED emitters to provide light associated with only one of the first set of three wavelengths and the second set of three wavelengths.

The light source may be configured with a left eye array of three of the six LED emitters providing left eye light at the first set of three wavelengths and with a right eye array of three of the six LED emitters providing right eye light at the second set of three wavelengths. During operations of the WMV light source, the first eye light and the second eye light may be balanced so as to include equal levels of red light, equal levels of green light, and equal levels blue light, whereby each of the viewer's eyes receives/perceives equal color values or illumination levels/amounts in each eye. In some cases, the levels of the red light differ from at least one of the levels of the green light and levels of the blue light (e.g., the colors are not necessarily illuminated equally during operations of the WMV light source).

In some embodiments, the WMV light source further includes a filter (e.g., a dichroic filter or a comb filter) associated with each of the six LEDs filtering the light provided by the LEDs to only output light at a wavelength matching one of the first and second sets of three wavelengths. In the same or other embodiments, the wavelength matching one or more wavelength in the first and second sets of three wavelengths could fall in a range of plus or minus 2 nanometers from one of the first and second sets of three wavelengths. In this way, "matching" is not limited to a specific wavelength but, instead, light with a matching wavelength can be provided in a range of wavelengths that includes one of the wavelengths defined for the particular type of WMV technology (e.g., to match the light output by the WMV projection system and passed by corresponding 3D glasses).

In other cases, a single full spectrum LED or lamp may be used behind finely-tuned notch filters (described herein) instead of RGB LEDs of the red bandwidth, green bandwidth, or blue bandwidth. The full spectrum light source would produce light with all the colors in it that are available and/or can be filtered out to achieve a desired result.

BRIEF DESCRIPTION OF THE DRAWINGS

FIG. 3 illustrates a perspective view of an operating WMV light source with two arrays of three LED emitters or bulbs (i.e., two sets of RGB LED emitters or bulbs);

FIGS. 4A-4C illustrate the WMV light source of FIG. 3 in three additional operating states (e.g., in response to control signals from a controller such as the one shown in FIG. 1)

DETAILED DESCRIPTION OF THE PREFERRED EMBODIMENTS

Figure 1:
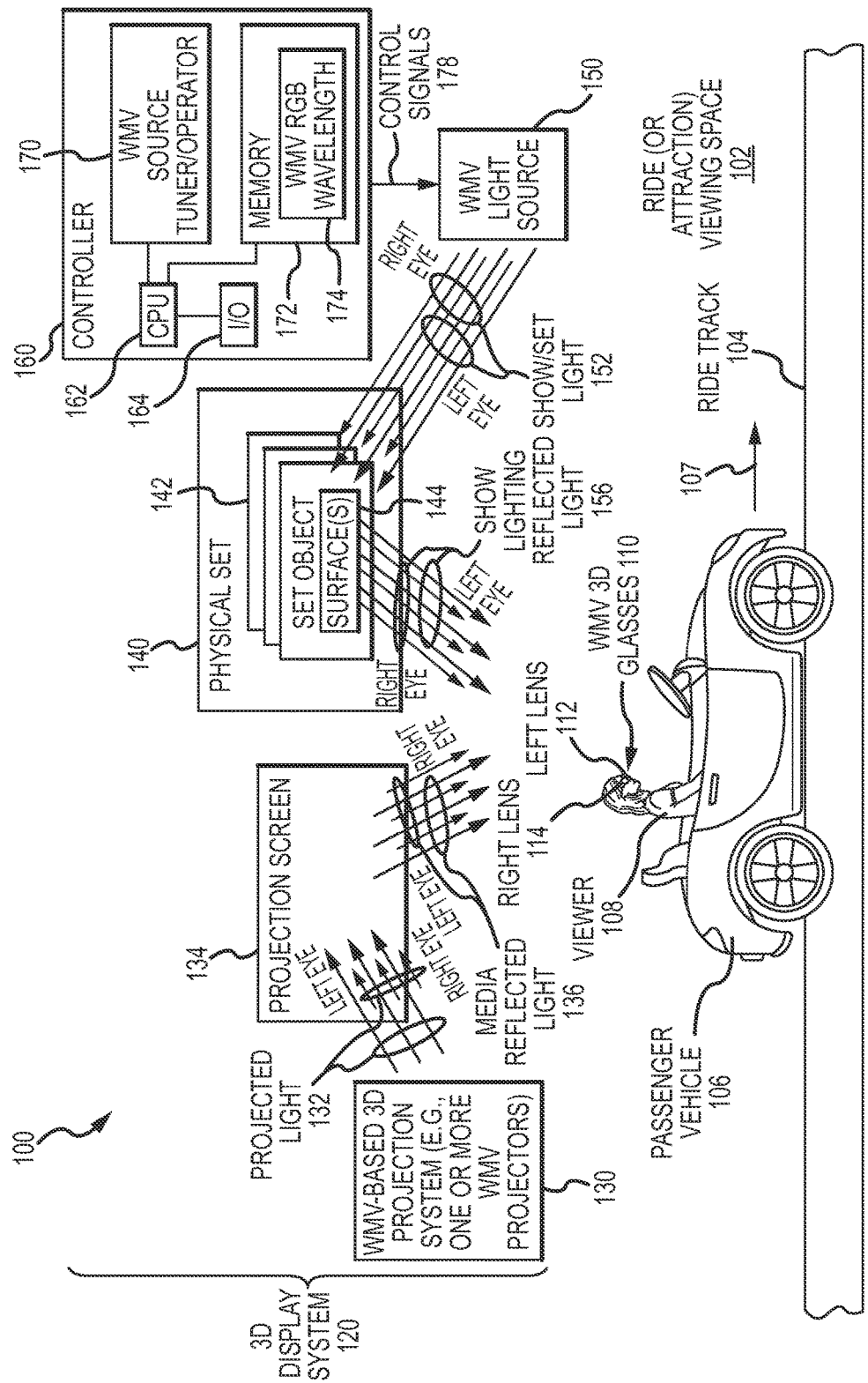
FIG. 1 is a diagram or functional block diagram of an amusement park ride with a 3D display system of the present description showing use of a WMV light source or fixture to provide normalized or balanced show lighting for a physical set for viewing by a viewer wearing WMV-based 3D glasses.

The inventors recognized that more and more amusement park attractions such as dark rides are being developed and implemented that use stereo projection to deliver show scenic and story content. The stereo or 3D projection is typically one of the two types of wavelength multiplexing visualization (WMV) technologies discussed above in the background, and these two types of WMV technology are based on a comb filter technology (e.g., the WMV technology developed by Infitec). The WMV or 3D technology is based on a principle of a left eye and a right eye system of light. The left eye of each viewer receives three narrow-band specific, primary red-green-blue wavelengths while the right eye receives three different narrow-band specific, primary red-green-blue wavelengths.

The projection system (regardless of which WMV or light engine technology (laser or lamp) is used) delivers the left eye/right eye media content onto a projection surface (front or rear projection surface). The viewer wears special WMV-based 3D glasses (e.g., comb filter glasses suited to the particular recipe of wavelengths used by the WMV or 3D projector(s)) that transmit the information (i.e., light) selectively to the left and right eyes. In this way, any light produced by the WMV projector(s) is part of the 3D display system along with the matching WMV-based 3D glasses so that the projected light works with the 3D glasses (is viewable when transmitted from the projection surface to the viewer or into a viewing space). For example, a typical dark ride in an amusement park may have one, two, or more sections in which 3D projectors are provided to project content onto projection surfaces and entertain riders in a passenger vehicle that are each wearing the matching WMV-based 3D glasses with 3D or stereo environment or display.

One problem this creates for dark ride and 3D attraction designers is that it is undesirable to request or force the viewers to put the 3D glasses on and then take them off in a repeated manner throughout the ride experience or in various portions of an attraction. This is a significant problem as areas outside the range of the 3D projector(s) or where there are no special projector surfaces are still viewed through the 3D glasses by the viewers but the lighting is not suited for the 3D glasses. In other words, current methods of providing show or ride lighting for the rest of the show/attraction or other lengths of the ride path in a dark ride or other 3D ride are not part of the 3D display system and are not designed to work with the WMV-based 3D glasses.

The inventors recognized that the amusement park industry and other industries are moving towards the use of RGB (red, green, and blue) LEDs (light emitting diodes) for lighting emitters to light environments including attraction and dark ride sets. This is being driven by a number of factors including: (1) LEDs produce less heat, which lowers the cost of cooling-based electric bills; (2) LEDs are long lived so there is fewer lamp changes; (3) LEDs use less electricity to provide similar lighting levels; and (4) LEDs can have a much smaller form factor that allows them to be fit into tight spaces. Further, though, the inventors understood that LEDs are color adjustable, such as by digital multiplex (DMX) control instead of with dichroic filters of gels as used with prior lights/lamps, and the inventors determined that such control can be used to match the "recipe" of any particular WMV technology used in a 3D display system to illuminate the environment (or portions of a set or the like) for viewing through WMV-based 3D glasses. In a conventional LED lighting fixture the lighting is based on using three primary colored LEDs in an array to produce many colors (e.g., up to 16 million different colors).

The issue recognized by the inventors with such conventional LED fixtures is that the LEDs are not tuned to the same wavelengths as used by WMV projectors in nearby 3D theaters or portions of a ride (e.g., in other parts of the environment or space illuminated by a 3D display system). In other words, conventional LED fixtures do not include LEDs at the same primary center points as any of the various types of WMV technology discussed above (e.g., do not match the recipe of wavelengths of a particular company producing, distributing, or licensing a type of WMV technology and their projectors or projection technology). For example, each manufacturer of WMV-based 3D projectors (and matching 3D glasses) may use a slightly different set of primaries (or wavelength settings for red, green, and blue light sources).

Hence, when a set or environment is viewed through WMV-based 3D glasses, the result of the display is dependent upon which LED lighting fixture from a given LED manufacturer one uses to illuminate the set or environment, with each conventional LED lighting fixture typically providing a different, undesirable artifact. For example, the various illuminated objects of a 3D show element, which are not being projected upon by a WMV projector but lit by LED lighting fixtures, do not blend well together as WMV-based 3D glasses may filter out a significant amount of the light provided by the non-tuned LED lighting fixture. This may result in incorrect coloring such as by filtering out all or portions of the red light while passing some portions of the green and blue light. One will understand that this is an undesirable result, and the 3D display systems described herein are configured to better blend the physical environment being illuminated by the 3D display system (not projected upon by a WMV projector in most cases) to the WMV projection system's recipe or set of wavelengths. This allows the viewer wearing the WMV-based 3D glasses to more readily believe that the 3D media content that is projected and experiences is part of the physical environment.

Briefly, a 3D display system is described that includes at least one WMV light source that is controlled and/or configured to be tuned (or selectively tunable) to match a WMV projector(s) (or projection system) and corresponding WMV-based glasses that may be worn by viewers of objects illuminated by the WMV light source. The WMV light source, for example, may include first and second arrays or sets of red, green, and blue LEDs so as to provide light for illuminating surfaces of a physical environment (e.g., a show or dark ride set) with light that is visible by the left and right eyes of the glass-wearing viewers. To this end, it is desirable for light from the first array of RGB LEDs to be transmitted or passed through the left eye filter and for light from the second array of RGB LEDs to be transmitted or passed through the right eye filter.

With this goal in mind, the WMV light source includes LEDs that are tuned (or selectively tunable) to match (or be within an acceptable wavelength range about) the six primary RGB wavelengths in a given WMV projection system (e.g., the WMV projection system used in the display system to project stereo content). Significantly, such tuning of the wavelengths of light output by the WMV light source (which may use other components than LEDs as discussed below) assures that the colors created by the WMV light source work with the WMV-based 3D glasses used to view the stereo content projected on a projection surface by the WMV projection system. The viewer sees colors and lighting through their WMV-based 3D glasses as they do in the projected media or stereo content. In the LED exemplary implementation of a WMV light source, a controller may be provided to control the output wavelength of each of the LEDs (that may be thought of as primary left eye RGB wavelength LEDs and primary right eye RGB wavelength LEDs) to produce a normalized lighting or to mix colors to produce desirable stereo artifacts and special effects viewable through the WMV-based 3D glasses.

FIG. 1 is a diagram or functional block diagram of an amusement park ride 100 with a 3D display system 120 of the present description showing use of a WMV light source or fixture 150 to provide normalized or balanced show lighting 152 for a physical set for viewing by a viewer 108 wearing WMV-based 3D glasses 110. In other cases, though, the 3D display system 120 may be utilized in an attraction or show in which the viewer 108 is seated, standing, walking through, or otherwise in the viewing space 102. As shown, the ride 100 includes a ride track 104 and a passenger vehicle 106 is caused to move as shown in arrow 107 along a ride path defined by the ride track 104, which causes the vehicle 106 to pass through a ride viewing space 102.

More specifically, the passenger vehicle 106 passes by a projection screen 134 in the 3D display system 120 and by a physical or show set (or 3D environment) 140 with a number of set objects 142 each with one or more surfaces 144 (2D or 3D surfaces). The 3D display system 120 includes a WMV-based 3D projection system 130 operating to provide stereo content by projecting light 132 onto the projection screen 134 (rear or front projection screen). From the screen 134, light 136 is reflected (or transmitted if rear projection is used) toward the viewer 108 in the passenger vehicle 106. The WMV-based 3D projection system 130 is adapted, such as with one or two (or more) WMV projectors, to project the light 132 with a predefined set of six primary color (or RGB) wavelengths (e.g., the WMV "recipe" with three wavelengths used to provide left eye light and three wavelengths used to provide right eye light) such as left eye light with wavelengths of 465 nm, 547 nm, and 657 nm and right eight light with wavelengths of 445 nm, 525 nm, and 637 nm.

In the projected light 132, the left eye wavelengths differ from the right eye wavelengths, and the 3D display system 120 includes a pair of WMV-based 3D glasses (or filters) 110. In the glasses 110, a left lens 112 is provided that filters (e.g., a comb filter) all light except the left eye wavelengths of the WMV-based 3D projection system 130 and a right lens 114 is included that filters all light except the right eye wavelengths of the WMV-based 3D projection system 130. In this manner, the output light 132 (left and right eye light) from the 3D projection system 130 is used to produce stereo content viewable via light 136 (first reflected light or media reflected light) from the projection screen 134 that is selectively passed through the lenses 112, 114 to the viewer's left and right eyes.

The 3D display system 120 also includes the physical set or show space 140 with a number (one or more) of objects 142 (e.g., 2D or 3D items themed to the ride 100 or an attraction) that each has one or more surfaces 144 facing outward toward the track 104 and passing vehicle 106. As discussed above, it is desirable to illuminate the surfaces 144 of the objects 142 with light that is normalized or balanced to display desired colors without artifacts when viewed by the viewer 108 through the WMV 3D glasses 110. If conventional light is used, the primary colors may be provided with wavelengths that will be undesirably filtered out by the lenses 112, 114, which can result in a strange, viewer-detectable color imbalance such as with too much green in one eye, no red in one or both eyes, and so on.

To overcome this problem, the 3D display system 120 includes a WMV light source (or controlled-wavelength light source) 150 that is operated by the controller 160 via control signals 178 to output show or set lighting 152 that is tuned or matched to the projected light 132 such that the light 156 reflected from the surfaces 144 of the objects 142 is viewable as desired by the viewer 108 via the WMV-based 3D glasses 110. For example (but not as a limitation), the WMV light source or fixture 150 may include an array of three RGB LED light emitters to provide left eye light and an array of three RGB LED light emitters to provide right eye light, and the left and right eye light may be combined to provide the show/set light 152. Each of the RGB LEDs can be tuned to provide light at a wavelength that matches (identically or with a range that includes) one of the predefined wavelengths of light provided in the projected light 132 projected by the WMV-based 3D projection system. For example, a green LED light emitter in the left eye array of the WMV light source may be tuned to provide light at a wavelength matching that of the left eye green light provided by the WMV-based 3D projection such that the viewer's left eye will receive this green light 156 reflected from the surfaces 144 of the objects 142 via the left eye lens 112.

The 3D display system 120 includes a controller 160 for generating the control signals 178 to control (e.g., tune and/or selectively operate over time) the WMV light source 150. The controller 160 may take many forms to practice the 3D display system 120 such as a computing or electronic device with one or more processors 162 executing code or software in memory (or computer readable media) 172 to perform certain functions. For example, the controller 160 may include programs/code to provide a WMV source tuner/operator 170 to generate the control signals 178, which may be transmitted in a wired or wireless manner to the WMV light source 150 via input/output devices 164 operated by the processor 162. In this manner, DMX control may be provided by the controller 160 for the WMV light source 150 to generate the normalized/balanced show/set light 152.

The memory 172 may be used to store a set of wavelengths 174 defining the recipe used by the WMV-based 3D projection system 130 in providing stereo content with its projected light 132. Particularly, the WMV RGB wavelengths 174 may define the red, green, and blue wavelengths used for left eye light and the differing red, green, and blue wavelengths used for right eye light by the system 130 (and not blocked by or transmitted by the filters/lenses 112, 114, respectively). The WMV source tuner/operator 170 may access the WMV RGB wavelengths 174 and use these to tune/operate the light source 150 to provide the light 152 with each (or a subset) of the wavelengths 174 to match the projected light 132.

For example, in an LED fixture implementation, RGB emitters in a left eye array would be tuned to provide light 152 at the left eye RGB frequencies and RGB emitters in a right eye array would be tuned via control signals 178 to provide light 152 at the right eye RGB frequencies defined for a particular WMV (e.g., a particular WMV projector in the system 130 and a particular set of filters provided in the glasses 110). The "tuning" or "matching" may be performed to exactly match the WMV such as when the left eye green is provided at a wavelength of 547 nm the WMV light source 150 may be operated to provide left eye green also at a wavelength of 547 nm. In other cases, though, a small range of wavelengths may be provided such as plus or minus 1 to 3 nm about a primary or defined WMV wavelength so as to account for manufacturing tolerances and changes in the operation of components of the light source 150 over time.

An operator may use the I/O 164 (e.g., a touchscreen with a GUI generated by the tuner/operator 170) to provide user input to cause the WMV source tuner/generator 170 to create the signals 178 to achieve a variety of results or variety of show/set light 152. Also, in some 3D display systems 120 there may be no controller 160 with the WMV light source 150 configured to provide light with wavelengths matching the primary RGB wavelengths of the WMV-based 3D projection system 130 whenever powered on to provide the light 152. When included, the controller 160 with the tuner/operator 170 may operate to provide one or more of the following special effects or outcomes: (a) no light 152 such as when only the stereo content is provided with light 132 from 3D projection system 130; (b) provide light 152 with a balanced amount or level of light over the viewer's left and right eyes (transmitted through the left and right lenses 112, 114 of 3D glasses 110) by providing equal levels/amounts of left and right eye RGBs; (c) provide light 152 with all right or left eye RGB frequencies (i.e., all right eye light or left eye light at differing times of operation); and (d) provide light 152 (right and left eye light) with differing amounts (including no light) from each of the components providing RGB light for left eye or right eye viewing.

With regard, to operating state (b), for example, the light source 150 may include a left eye array with three LEDs and a right eye array with three LEDs, and the LEDs in each array may be operated to produce light of a wavelength matching the RGB wavelengths of left eye and right eye light in the WMV-based 3D projection system 130 (as defined in wavelength definitions 174). Each of the LEDs or LED emitters of each array would be selected to have (or be controlled to provide) equal light levels (e.g., at substantially equal lumens or within a predefined range of lumens) to provide desired balancing of reds, greens, and blues and right and left eye light in the reflected light 156 (second reflected light or show lighting reflected light) from the surfaces 144 of the set objects 142.

With regard to operating state (c), the light source components used to provide left and right eye light in the show/set light 152 may be turned on or off over time while the vehicle 106 is moving 107 past the physical set 140 so as to achieve a desired lighting effect (e.g., present light to one eye, to a different eye, and to both eyes over time). With the controller 160 and DMX control with signals 178, one skilled in the art will readily understand that there are nearly limitless visual effects that can be achieved with the use of the WMV light source 150 with the WMV-based 3D projection system 130 and viewers 108 wearing matching WMV-based 3D glasses, with the above effects/outcomes only being exemplary.

Figure 2:
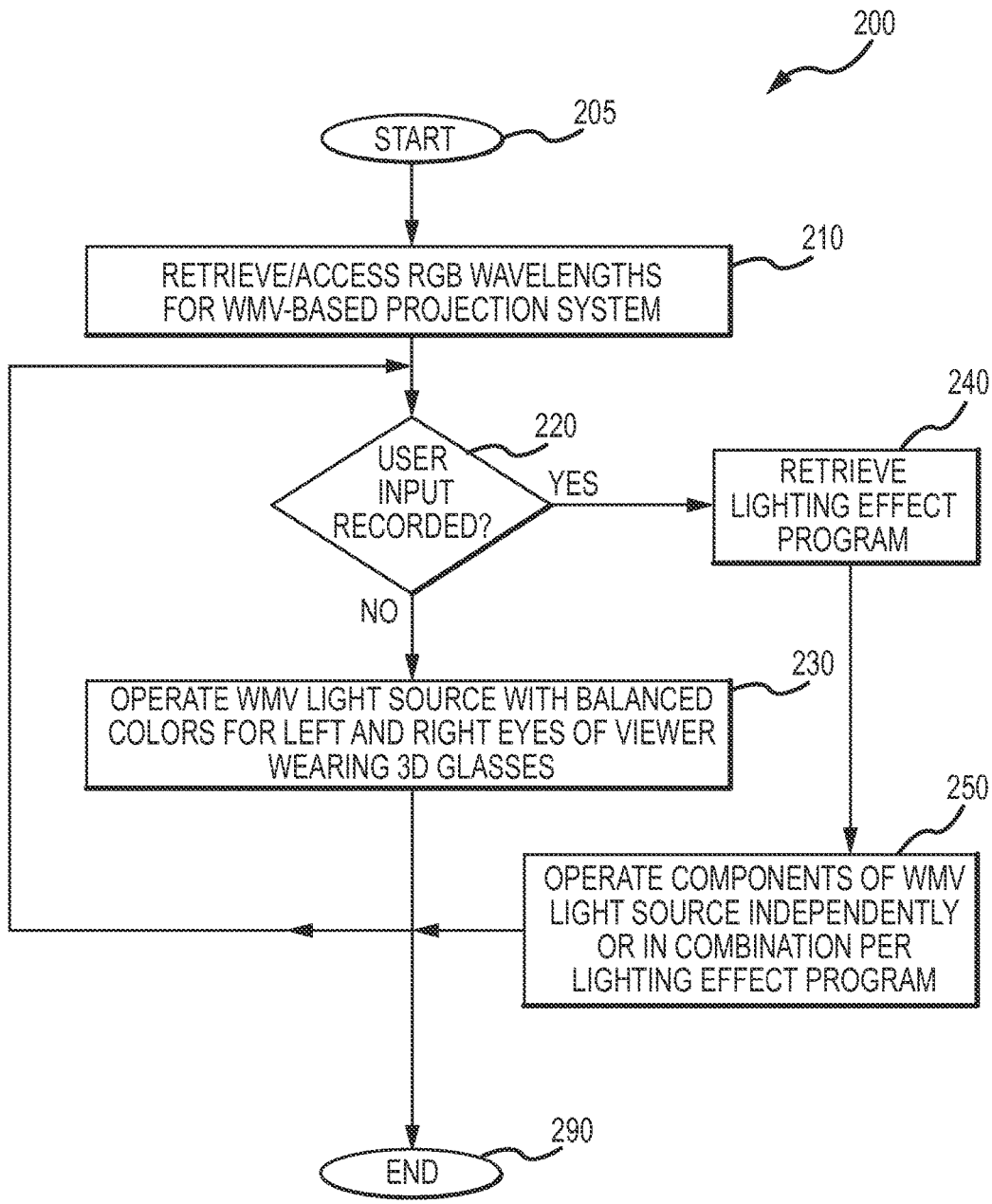
FIG. 2 illustrates flow diagram of a control algorithm or process that may be carried out by a controller of a 3D display system to operate a WMV light source to achieve a desired display or special effect.

FIG. 2 illustrates a flow diagram of a control algorithm or process 200 that may be carried out by a controller of a 3D display system (such as the 3D display system 120 of FIG. 1) to operate a WMV light source to achieve a desired display or special effect. The control process 200 starts at 205 such as with designing and/or selecting a WMV light source for use within a 3D display system. The WMV light source is selected to be operable in a controlled manner (or fixed in some cases) to produce each of the primary RGB colors provided by a WMV projector(s) in the 3D display system. For example, the light source may include first and second sets of RGB LEDs, and each of these LEDs or LED emitters is chosen to be operable (such as with DMX control) to output light at the six primary RGB color wavelengths provided by the WMV-based projector(s) (with an exact match or with a "tight" band about the primary wavelength such as plus or minus 1 to 3 nm or the like to limit undesirable artifacts).

The method 200 continues at 210 with the controller and/or the WMV source tuner/operator program acting to retrieve (or access from a remote device) the definition of the RGB wavelengths for the WMV-based projection system to be used in the 3D display system. As discussed above, there are various types of WMV technologies that may be used to provide a projection system (with one or more projectors) and each may use a different recipe or set of wavelengths defining RGB primary colors for left eye light and for right eye light (which will differ so as to allow different filters to be used in eye or headwear to selectively filter/deliver the left and right eye light from a projection screen/surface).

Then, the method 200 continues at 220 with a determination of whether or not user input has been provided (such as via a controller-provided GUI or the like) to choose an operating mode for the WMV light source. If not, the method 200 continues at 230 with the controller operating with control signals the WMV light source in a default manner. In the example provided in FIG. 2, the controller operates the WMV light source to provide equal levels of the three colors to the left and right eye such as by operating a left eye LED array and a right eye LED array in a similar manner (same brightness for each corresponding color LED emitter or bulb). The left eye light output has red, green, and blue light with the three wavelengths used for these colors in the left eye light in the WMV-based 3D projection system while the right eye light output has red, green, and blue light with the three wavelengths used for these colors in the right eye light in the WMV-based 3D projection system (e.g., with exactly the same wavelength and nothing or little other light or with light falling within a tight band about the defined primary color wavelength of the WMV-based projection system and corresponding viewer 3D glasses). The method 200 may stop at 290 or continue at 220 with a determination of whether user input has been received to modify the control of the WMV light source (method of control).

If user input is received at 220, the method 200 continues at 240 with retrieving a lighting effect program from memory (or another device linked to the controller) based on the user input. Then, at 250, the controller generates a set of control signals to operate the WMV light source to carry out the lighting effect program such as by operating the components of the light source independently or in combination/concurrently to achieve a desired show or set lighting output with light having at least one of the primary color wavelengths in the definition retrieved at step 210. In the LED array implementation of a light source, for example, the lighting effect program may define a time sequence for alternating between all right eye light (with the three primary color wavelengths of the WMV-based 3D projection system) and all left eye light (with the three primary color wavelengths of the WMV-based 3D projection system). The lighting effect program may instead (or additionally) define balancing levels for outputting the various colors to each eye (e.g., more red and less blue levels but equal levels to each eye, differing levels of certain colors to each eye, and so on). The method 200 may then end at 290 or continues at 220 with waiting for additional user input to modify the control of the WMV light source.

FIG. 3 illustrates a perspective view of a WMV light source 300 operating to output show or set lighting 340 that is suited for a particular WMV technology or for use with a particular design of WMV-based 3D glasses/filters. The WMV light source 300 makes use of red, green, and blue LEDs to provide the show or set light 340 with red light matching the red light of a WMV projector(s) with two arrays of three LED emitters or bulbs (i.e., two sets of RGB LED emitters or bulbs), with green light matching the green light of the WMV projector(s), and with blue light matching the blue light of the WMV projector(s).

Particularly, the light source 300 includes a housing 310 that is used to support a left eye light array (or assembly) 320 and a right eye light array (or assembly) 330. The left eye light array 320 includes a red LED emitter (one or more LEDs or LED bulbs) 322, a green LED emitter (one or more LEDs or LED bulbs) 324, and a blue LED emitter (one or more LEDs or LED bulbs) 326. The red LED emitter 322 is configured to be tuned and/or controlled to output red light 323 with a wavelength equal to the wavelength of the red light used to provide left eye light in the WMV projector(s) or a small band about the defined WMV wavelength for red, left eye light. The green LED emitter 324 is configured to be tuned and/or controlled to output green light 325 with a wavelength equal to the wavelength of the green light used to provide left eye in the WMV projector(s) or a small band about such a primary color wavelength. The blue LED emitter 326 is configured to be tuned and/or controlled to output blue light 327 with a wavelength equal to the wavelength of the blue light used to provide left eye light in the WMV projector(s) or a small band about such a primary color wavelength. Together, the colored light 323, 325, 327 from the LED array 320 provides the left eye light used to illuminate a show or attraction set, and this colored light 329 when reflected from surfaces in the physical environment (show or attraction set) is visible (or transmitted) through the left eye lens or filters of WMV-based 3D glasses suited for use with the WMV projector(s).

Similarly, the right eye light array 330 includes a red LED emitter (one or more LEDs or LED bulbs) 332, a green LED emitter (one or more LEDs or LED bulbs) 334, and a blue LED emitter (one or more LEDs or LED bulbs) 336. The red LED emitter 332 is configured to be tuned and/or controlled to output red light 333 with a wavelength equal to the wavelength of the red light used to provide right eye light with the WMV projector(s) or a small band about the defined WMV wavelength for red, right eye light. The green LED emitter 334 is configured to be tuned and/or controlled to output green light 335 with a wavelength equal to the wavelength of the green light used to provide right eye in the WMV projector(s) or a small band about such a primary color wavelength. Similarly, the blue LED emitter 336 is configured to be tuned and/or controlled to output blue light 337 with a wavelength equal to the wavelength of the blue light used to provide right eye light in the WMV projector(s) or a small band about such a primary color wavelength. Together, the colored light 333, 335, 337 from the LED array 330 provides the right eye light used to illuminate a show or attraction set, and this colored light 339 when reflected from surfaces in the physical environment (show or attraction set) is visible (or transmitted) through the right eye lens or filters of WMV-based 3D glasses suited for use with the WMV projector(s). The combination of the left eye light 329 with the right eye light 339 from the two LED arrays 320, 330 produces the show or set light 340 that is suited for use with WMV-based 3D glasses that also can be used with the particular WMV-based projector(s).

Figure 4C:
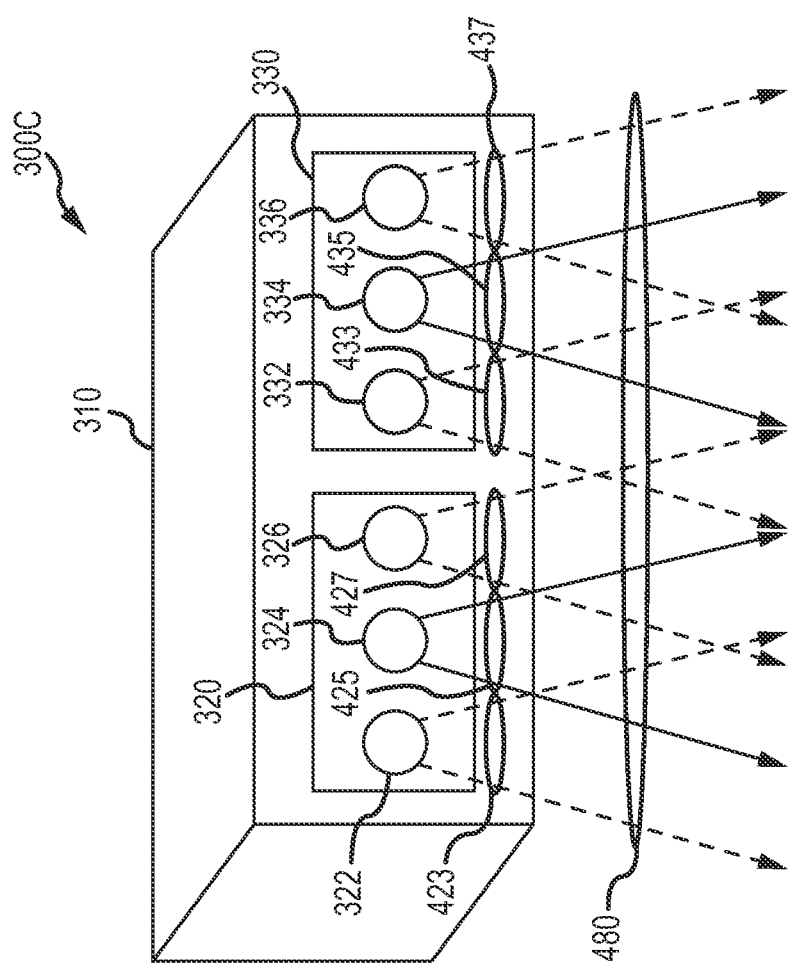

As discussed above with reference to FIGS. 1 and 2, the light sources of the present description may be operated in a variety of states (e.g., in response to control signals from a controller) to achieve a variety of special effects or to obtain a desired illumination of a physical set or stereo environment. FIG. 3 illustrates one such operating state, and FIGS. 4A-4C illustrate the WMV light source 300A, 300B, and 300C in three additional and different operating states.

In FIG. 4A, the WMV light source 300A is operating such that the left eye array 320 and right eye array 420 are operated in similar fashion with a subset of the LED emitters illuminated and the same subset in each array 320, 420. Particularly, there may be some applications where it is desirable to provide monochromatic coloring or illumination of objects in a physical set or stereo environment. The example provide in FIG. 4A is the source 300A operating to output left eye green light 325 concurrently with outputting right eye green light 335 to provide show or set lighting 460 that is wholly green that is equally visible (balanced to match) by a viewer's left and right eyes via left and right lenses/filters of WMV-based 3D glasses paired to the WMV light source 300A (e.g., with identical primary color wavelength filters as outputs of light arrays 320, 330). The level of light or illumination (range of lumens or the like) provided by each LED emitter or bulb 324, 334 may be equal as shown or may differ by some desired amount to achieve a desired effect.

In other cases not shown but readily understood in view of FIG. 4A, different subsets of the emitters 322, 324, 326, 332, 334, 336 may be used to provide the show or set light such as the following combinations: (a) left eye red emitter 322 with right eye red emitter 332; (b) left eye blue emitter 326 with right eye blue emitter 336; (c) both red emitters 322, 332 with both green emitters 324, 334; (d) both red emitters 322, 332 with both blue emitters 326, 336; and (e) both green emitters 324, 334 with both blue emitters 326, 336. Again, the left and eye LED emitters in each array 320, 330 may be operated (or tuned) to provide the same or very similar amounts or levels of illumination while in other cases it may be useful to intentionally provide more or less illumination to one eye (e.g., both red LED emitters 322, 332 operating concurrently but at two different illumination levels). The combinations of LED emitter combinations is nearly limitless and the independent operation of each colored LED emitter allows a wide range of subsets to be utilized to suit the artistic design of a 3D display system.

In FIG. 4B, the WMV light source 300B is operating such that only the left eye array 320 is operating with the right eye array 330 being turned off or down low. All or a subset of the colored LED emitters 322, 324, 326 of the array 320 may be concurrently operated, while in other cases, the right eye array 330 may be operated while the left light array 320 is turned off or down to low illumination levels. Further, the operation of the two arrays 320, 330 may be alternated over time with one on and one off and vice versa in an alternating pattern to achieve a desired effect. As shown in FIG. 4B, the three colored LED emitters 322, 324, 326 are operated to provide equal levels of illumination (quantities of red light 323, green light 325, and blue light 326) to produce the show or set lighting 470 to illuminate surfaces of objects in a physical set or stereo environment. In other cases, the illumination levels for the three emitters 322, 324, and 326 may differ from each other (or at least one may differ with a lower or higher illumination setting provided by a controller of the light source 300B) to achieve a desired illumination effect.

In FIG. 4C, the WMV light source 300C is operating such that both the left and right eye arrays 320, 330 are concurrently being operated. In contrast to operations shown in FIG. 3, though, the LED emitters are tuned to provide balance in illumination levels/amount between the left and right eyes of a viewer but differing amounts of each color. This can be seen in FIG. 4C with the left eye red LED 322 providing red light 423 of a particular wavelength and illumination level and with right eye red LED 332 providing red light 433 of another wavelength (as discussed throughout this description, the wavelengths are chosen to match (or at least overlap) with the primary wavelengths of the WMV technology used for a 3D projector in the display system in which the light source 300C is implemented) and an illumination level matching (or within an overlapping range) that of the left eye red LED 322. Further, the left eye green LED 324 provides green light 425 of a particular wavelength and illumination level (differing from the emitters 322, 332) and with right eye green LED 334 providing green light 435 of another wavelength and an illumination level matching (or within an overlapping range) that of the left eye green LED 324. Concurrently, the left eye blue LED 326 provides green light 427 of a particular wavelength and illumination level (differing from the emitters 322, 332 and the emitters 324, 334) and with right eye blue LED 336 providing green light 437 of another wavelength and an illumination level matching (or within an overlapping range) that of the left eye blue LED 326. The combination of these LED outputs provides the show or set lighting 480 of the WMV light source 300C in this operating state, and FIG. 4C shows how independent operation of the LEDs or LED emitters allows balancing of the various colors provided by the source 300C to avoid artifacts associated with use of more conventional LED lighting assemblies with WMV-based 3D glasses.

Figure 5:
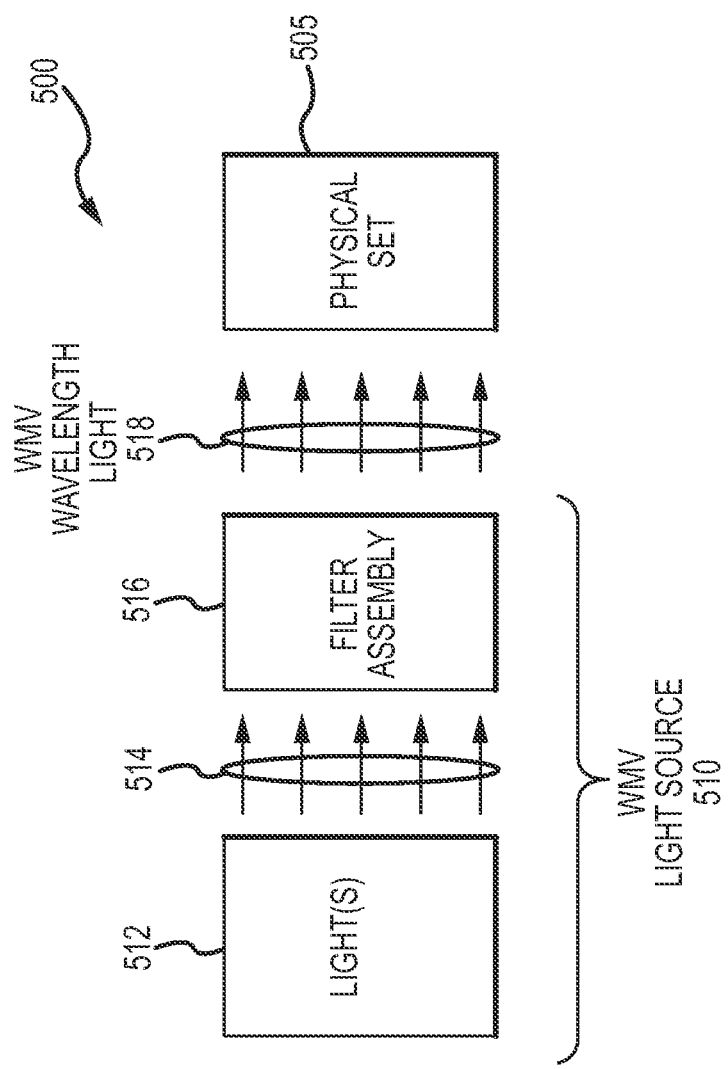
FIG. 5 illustrates a functional block or schematic drawing of another 3D display system of the present description.

FIG. 5 illustrates another exemplary 3D display system 500 of the present description. As shown, the system 500 includes a physical set 505 that may include a number of 2D and/or 3D objects to be illuminated that will be viewed by a viewer wearing WMV-based 3D glasses with a particular wavelength recipe or set of definitions for the primary color wavelengths (e.g., matching that of a projector(s) implementing a type of WMV technology). The system 500 also includes a WMV light source 510 with one or more light or light emitters 512 (e.g., a halogen light(s), LEDs, lasers, or the like) that output light 514. To ensure that the light 514 is matched to a particular WMV projector and corresponding WMV-based 3D glasses, the WMV light source 510 also includes a filter assembly 516 that is configured to filter the output light 514 to produce light 518 with primary color light with wavelengths matching the particular WMV technology. To this end, the filter assembly 516 may include dichroic filters (e.g., a left eye filter and a right eye filter) that filter the light 514 to provide left and right eye light 518 with a desired set of wavelengths.

In one particular implementation, the lights 512 may take the form of the two arrays 320, 330 of LED emitters as shown in FIG. 3. In this case, it may be useful for the filter assembly 516 to include a separate filter for each of the LED emitters 322, 324, 326, 332, 334, and 336 so as to produce colored light in the show or set light 518 that is of desired wavelengths (i.e., wavelengths that match the six wavelengths defined for a particular WMV projector and its paired WMV-based 3D glasses). This may be desirable in some cases because typical LEDs/LED emitters may be difficult to tune/control to provide only the WMV-defined wavelengths. For example, an LED that is designed and manufactured to provide light at a particular wavelength (e.g., 637 nm) may provide light with a range of wavelengths (e.g., 630 to 644), and a specially selected and designed filter (e.g., a dichroic filter or a comb filter) can be provided with this LED to ensure that only (or mostly (e.g., 90 to 100 percent) light at 637 nm is output from this LED/LED emitter. Similar, filters can be provide for each of the six LED emitters to cause each LED emitter to only (or mostly) light at each of the six primary color wavelengths of the particular WMV technology be provided by the light source. The use of a filter assembly may also be desirable so that lights other than LEDs can be used to provide lights 512 such as halogen and other readily available lights.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the term "light source" is not intended to be limited to LEDs or LED emitters but may include nearly any light-producing components such as lasers, quantum dots, and broader spectrum light bulbs/devices. For example, a laser module or laser-based light engine may be useful (alone or with LED emitters) because some of the wavelengths that may be desired to make a WMV effect or "trick" work may not be common to or available with an LED emitter. In addition, there are newer model theatrical lighting instruments that utilize laser diode modules as their light engines, and these may be utilized separately or with one or more LEDs to provide the "light source" or light engine of the present description.

Further, the LED lighting fixture may be chosen to supply full spectrum light combined with the finely-tuned notch filters described herein. For example, a first or left laser projector may provide light (red, green, and blue) at wavelengths of 464 nm, 547 nm, and 657 nm and a second or right laser projector may provide light (red, green, and blue) at wavelengths of 445 nm, 525 nm, and 637 nm. A full spectrum LED lighting fixture may provide a bandwidth of, for example, blue (455 to 465 nm), which covers both eyes provided by the projectors so one can illuminate a surface and not have holes in the color.

We claim:

1. A display system, comprising:
a viewing space;
3D glasses or headgear wearable by a viewer in the viewing space, wherein the 3D glasses or headgear pass light associated with a first set of three wavelengths to a left eye and pass light associated with a second set of three wavelengths differing from the first set of three wavelengths to a right eye;
one or more objects positioned in the viewing space;
a wavelength multiplex visualization (WMV) projection system projecting light in the viewing space having the first and second sets of three wavelengths to provide the viewer stereo content via the 3D glasses or headgear; and
a WMV light source providing colored show light for illuminating the surfaces of the objects with color for the viewer to observe through the 3D glasses or headgear, wherein the colored show light comprises light at one or more wavelengths matching one or more wavelengths in the first and second sets of three wavelengths, wherein the colored show light is free of the stereo content, and wherein the WMV light source is spaced apart from the WMV projection system.

2. The display system of claim 1, wherein the WMV light source comprises at least one of a laser module and six light emitting diode (LED) emitters each operable to provide light at a differing one of the first and second sets of three wavelengths and wherein the WMV projection system provides the viewer stereo content via one or more surfaces that are independent and spaced apart from the surfaces of the objects.

3. The display system of claim 2, wherein the WMV light source further comprises a controller providing control signals to independently operate each of the LED emitters.

4. The display system of claim 3, wherein the controller operates the WMV light source to selectively operate the LED emitters to provide light associated with only one of the first set of three wavelengths and the second set of three wavelengths.

5. The display system of claim 2, wherein a left eye array of three of the six LED emitters provides left eye light at the first set of three wavelengths and a right eye array of three of the six LED emitters provides right eye light at the second set of three wavelengths.

6. The display system of claim 5, wherein the first eye light and the second eye light are balanced to include equal levels of red light, equal levels of green light, and equal levels blue light.

7. The display system of claim 6, wherein the levels of the red light differ from at least one of the levels of the green light and levels of the blue light.

8. The display system of claim 1, wherein the WMV light source further comprises a filter associated with each of the six LEDs filtering the light provided by the LEDs to only output light at a wavelength matching one of the first and second sets of three wavelengths.

9. The display system of claim 1, wherein the wavelength matching one or more wavelength in the first and second sets of three wavelengths falls in a range of plus or minus 2 nanometers from one of the first and second sets of three wavelengths.

10. A display system for illuminating surfaces of objects for a viewer in a viewing space wearing 3D glasses or headgear passing light associated with a first set of three wavelengths to a left eye and passing light with a second set of three wavelengths differing from the first set of three wavelengths, comprising:
a projection system projecting light having the first and second sets of three wavelengths to provide stereo content via the 3D glasses or headgear; and
a light source providing light for illuminating the surfaces of the objects for the viewer to observe through the 3D glasses or headgear separate from, and in addition to, the stereo content, wherein the light includes colored light at a wavelength matching one or more wavelength in the first and second sets of three wavelengths and wherein the projection system projects onto one or more surfaces that differ from and are spaced apart from the surfaces of the objects illuminated by the light source.

11. The display system of claim 10, wherein the light source comprises at least one of a laser module and six light emitting diode (LED) emitters each operable to provide light at a differing one of the first and second sets of three wavelengths and wherein the light source further comprises a controller providing control signals to independently operate each of the LED emitters.

12. The display system of claim 11, wherein the controller operates the light source to selectively operate the LED emitters to provide light associated with only one of the first set of three wavelengths and the second set of three wavelengths.

13. The display system of claim 11, wherein a left eye array of three of the six LED emitters provides left eye light at the first set of three wavelengths and a right eye array of three of the six LED emitters provides right eye light at the second set of three wavelengths.

14. The display system of claim 13, wherein the first eye light and the second eye light are balanced to include equal levels of red light, equal levels of green light, and equal levels blue light.

15. The display system of claim 14, wherein the levels of the red light differ from at least one of the levels of the green light and levels of the blue light.

16. The display system of claim 10, wherein the light source further comprises a filter associated with each of the six LEDs filtering the light provided by the LEDs to only output light at a wavelength matching one of the first and second sets of three wavelengths.

17. A display system for illuminating surfaces of objects for a viewer in a viewing space wearing 3D glasses or headgear passing light associated with a first set of three wavelengths to a left eye and passing light with a second set of three wavelengths differing from the first set of three wavelengths, comprising:
a wavelength multiplex visualization (WMV) projection system projecting light having the first and second sets of three wavelengths to provide the viewer stereo content via the 3D glasses or headgear; and a WMV light source providing colored light for illuminating the surfaces of the objects for the viewer to observe the surfaces of the objects via reflected portions of the colored light through the 3D glasses or headgear separately from the stereo content provided by the WMV projection system, wherein the colored light comprises light at a wavelength matching one or more wavelength in the first and second sets of three wavelengths, wherein the WMV light source comprises six light emitting diode (LED) emitters each operable to provide light at a differing one of the first and second sets of three wavelengths, and wherein the WMV light source further comprises a controller providing control signals to independently operate each of the LED emitters to independently set levels of light provided by each of the LED emitters.

18. The display system of claim 17, wherein the controller operates the WMV light source to selectively operate the LED emitters to provide light associated with only one of the first set of three wavelengths and the second set of three wavelengths.

19. The display system of claim 17, wherein a left eye array of three of the six LED emitters provides left eye light at the first set of three wavelengths and a right eye array of three of the six LED emitters provides right eye light at the second set of three wavelengths, wherein the first eye light and the second eye light are balanced to include equal levels of red light, equal levels of green light, and equal levels blue light, and wherein the levels of the red light differ from at least one of the levels of the green light and levels of the blue light.

20. The display system of claim 17, wherein the wavelength matching one or more wavelength in the first and second sets of three wavelengths falls in a range of plus or minus 2 nanometers from one of the first and second sets of three wavelengths.

* * * * *